(12) United States Patent
Yan et al.

(10) Patent No.: US 8,997,113 B2
(45) Date of Patent: Mar. 31, 2015

(54) SHARING VIRTUAL FUNCTIONS IN A SHARED VIRTUAL MEMORY BETWEEN HETEROGENEOUS PROCESSORS OF A COMPUTING PLATFORM

(75) Inventors: Shoumeng Yan, Beijing (CN); Sai Luo, Beijing (CN); Xiaocheng Zhou, Beijing (CN); Ying Gao, Beijing (CN); Hu Chen, Beijing (CN); Bratin Saha, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/000,621

(22) PCT Filed: Sep. 24, 2010

(86) PCT No.: PCT/CN2010/001470
§ 371 (c)(1),
(2), (4) Date: Dec. 21, 2010

(87) PCT Pub. No.: WO2012/037706
PCT Pub. Date: Mar. 29, 2012

(65) Prior Publication Data
US 2013/0173894 A1 Jul. 4, 2013

(51) Int. Cl.
*G06F 9/44* (2006.01)
*G06F 9/38* (2006.01)
(Continued)

(52) U.S. Cl.
CPC .............. *G06F 9/3885* (2013.01); *G06F 8/447* (2013.01); *G06F 9/548* (2013.01)
USPC ........... 719/312; 719/316; 719/331; 717/140; 717/162; 712/10

(58) Field of Classification Search
None
See application file for complete search history.

(56) References Cited

U.S. PATENT DOCUMENTS 5,297,284 A * 3/1994 Jones et al. .................... 717/137
5,590,327 A * 12/1996 Biliris et al. .................. 718/100
(Continued)

FOREIGN PATENT DOCUMENTS

CN     1524228        8/2004
CN     101187902 A    5/2008
(Continued)

OTHER PUBLICATIONS

International Search Report and Written Opinion for PCT Patent Application No. PCT/CN2010/00470 Mailed Jun. 30, 2011, 9 Pages.
(Continued)

*Primary Examiner* — Andy Ho
*Assistant Examiner* — Shih-Wei Kraft
(74) *Attorney, Agent, or Firm* — Green, Howard & Mughal, LLP

(57) ABSTRACT

A computing platform may include heterogeneous processors (e.g., CPU and a GPU) to support sharing of virtual functions between such processors. In one embodiment, a CPU side vtable pointer used to access a shared object from the CPU 110 may be used to determine a GPU vtable if a GPU-side table exists. In other embodiment, a shared non-coherent region, which may not maintain data consistency, may be created within the shared virtual memory. The CPU and the GPU side data stored within the shared non-coherent region may have a same address as seen from the CPU and the GPU side. However, the contents of the CPU-side data may be different from that of GPU-side data as shared virtual memory may not maintain coherency during the run-time. In one embodiment, the vptr may be modified to point to the CPU vtable and GPU vtable stored in the shared virtual memory.

16 Claims, 6 Drawing Sheets

(51) Int. Cl.
*G06F 9/45* (2006.01)
*G06F 9/54* (2006.01)

(56) References Cited

U.S. PATENT DOCUMENTS

| | | | | |
|---|---|---|---|---|
| 5,802,367 | A * | 9/1998 | Held et al. | 719/332 |
| 5,812,852 | A * | 9/1998 | Poulsen et al. | 717/149 |
| 6,049,668 | A | 4/2000 | Smith et al. | |
| 6,052,528 | A * | 4/2000 | Dechamboux | 717/116 |
| 6,148,438 | A * | 11/2000 | Schmit | 717/137 |
| 6,189,046 | B1 * | 2/2001 | Moore et al. | 719/315 |
| 6,446,259 | B2 * | 9/2002 | Brett | 717/165 |
| 6,810,519 | B1 * | 10/2004 | Hicks | 717/166 |
| 7,584,473 | B2 * | 9/2009 | Forin et al. | 718/100 |
| 2003/0070006 | A1 * | 4/2003 | Nadler et al. | 709/330 |
| 2003/0135658 | A1 * | 7/2003 | Haggar et al. | 709/312 |
| 2004/0049765 | A1 * | 3/2004 | Hasha | 717/116 |
| 2004/0187094 | A1 * | 9/2004 | Gil et al. | 717/116 |
| 2005/0080998 | A1 | 4/2005 | Day et al. | |
| 2007/0180197 | A1 * | 8/2007 | Wright et al. | 711/141 |
| 2008/0178163 | A1 | 7/2008 | Gschwind et al. | |
| 2008/0256330 | A1 * | 10/2008 | Wang et al. | 712/24 |
| 2009/0055596 | A1 | 2/2009 | Wallach et al. | |
| 2009/0210646 | A1 * | 8/2009 | Bauman et al. | 711/170 |
| 2010/0118041 | A1 | 5/2010 | Chen et al. | |
| 2010/0180266 | A1 * | 7/2010 | Hiniker | 717/140 |
| 2010/0313189 | A1 * | 12/2010 | Beretta et al. | 717/148 |

FOREIGN PATENT DOCUMENTS

| | | |
|---|---|---|
| JP | 61-084740 A | 4/1986 |
| JP | 10-207709 A | 8/1998 |
| JP | 10-320203 A | 12/1998 |
| JP | 3874603 B2 | 1/2007 |
| JP | 2009-211167 A | 9/2009 |
| WO | 2012/037706 A1 | 3/2012 |

OTHER PUBLICATIONS

Extended European Search report received for EP Patent Application No. 10857421.1, mailed on Mar. 6, 2014, 8 pages.

International Preliminary Report on Patentability and Written Opinion received for PCT Patent Application No. PCT/CN2010/001470, mailed on Apr. 4, 2013, 5 pages.

Extended European Search Report received for European Patent Application No. 10857421.1, mailed on Mar. 6, 2014, 8 pages.

Office Action received for Japanese Patent Application No. 2013-529523, mailed on May 20, 2014, 22 pages of Office Action including 8 pages of English Translation.

International Preliminary Report on Patentability and Written Opinion Received for PCT Patent Application No. PCT/CN2010/001470, mailed on Apr. 4, 2013, 8 pages.

Office Action received for Korean Patent Application No. 10-2013-7006592, mailed on Sep. 27, 2014, 4 Pages of Office Action and 4 Pages of English Translation.

* cited by examiner

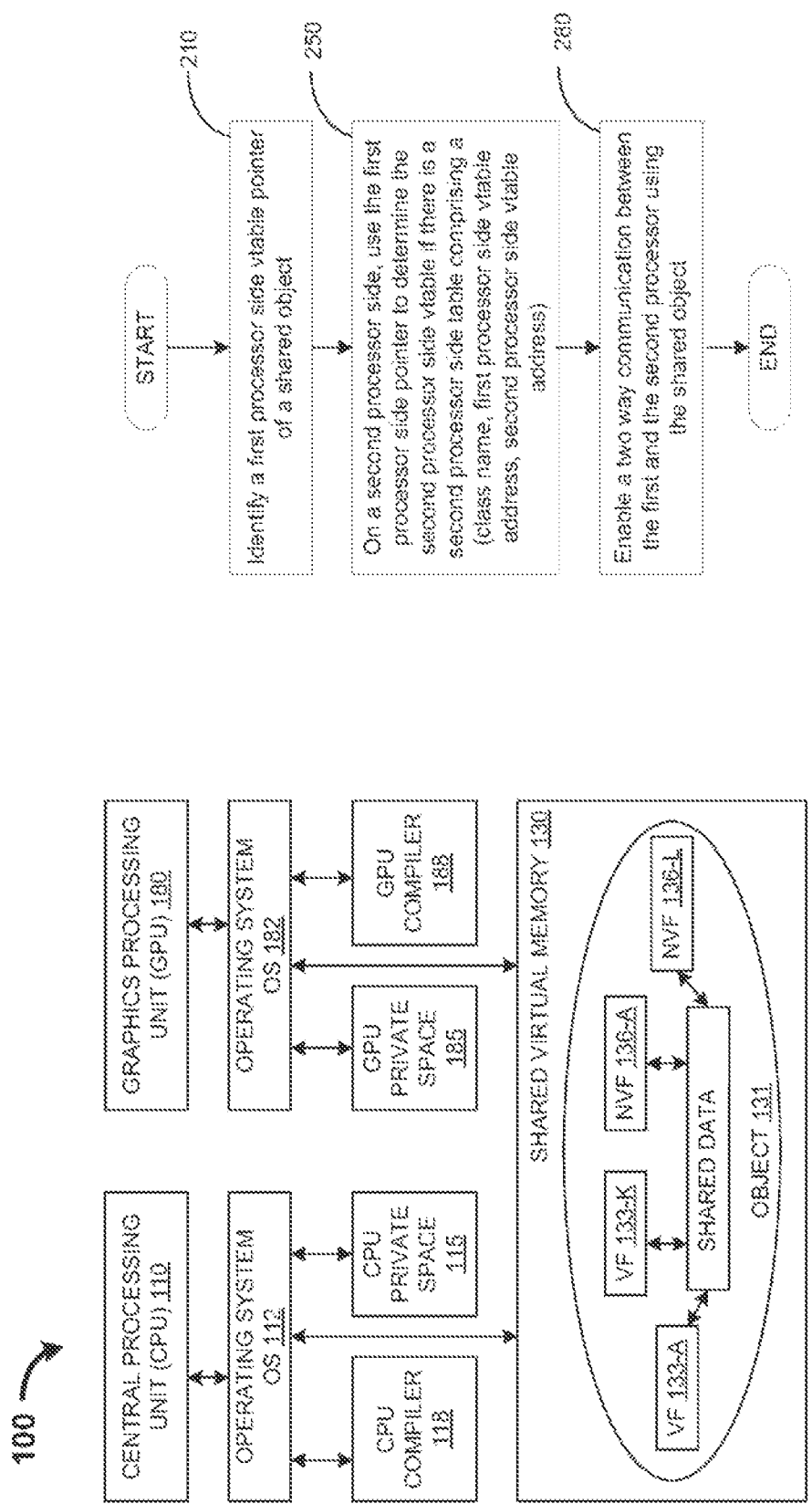

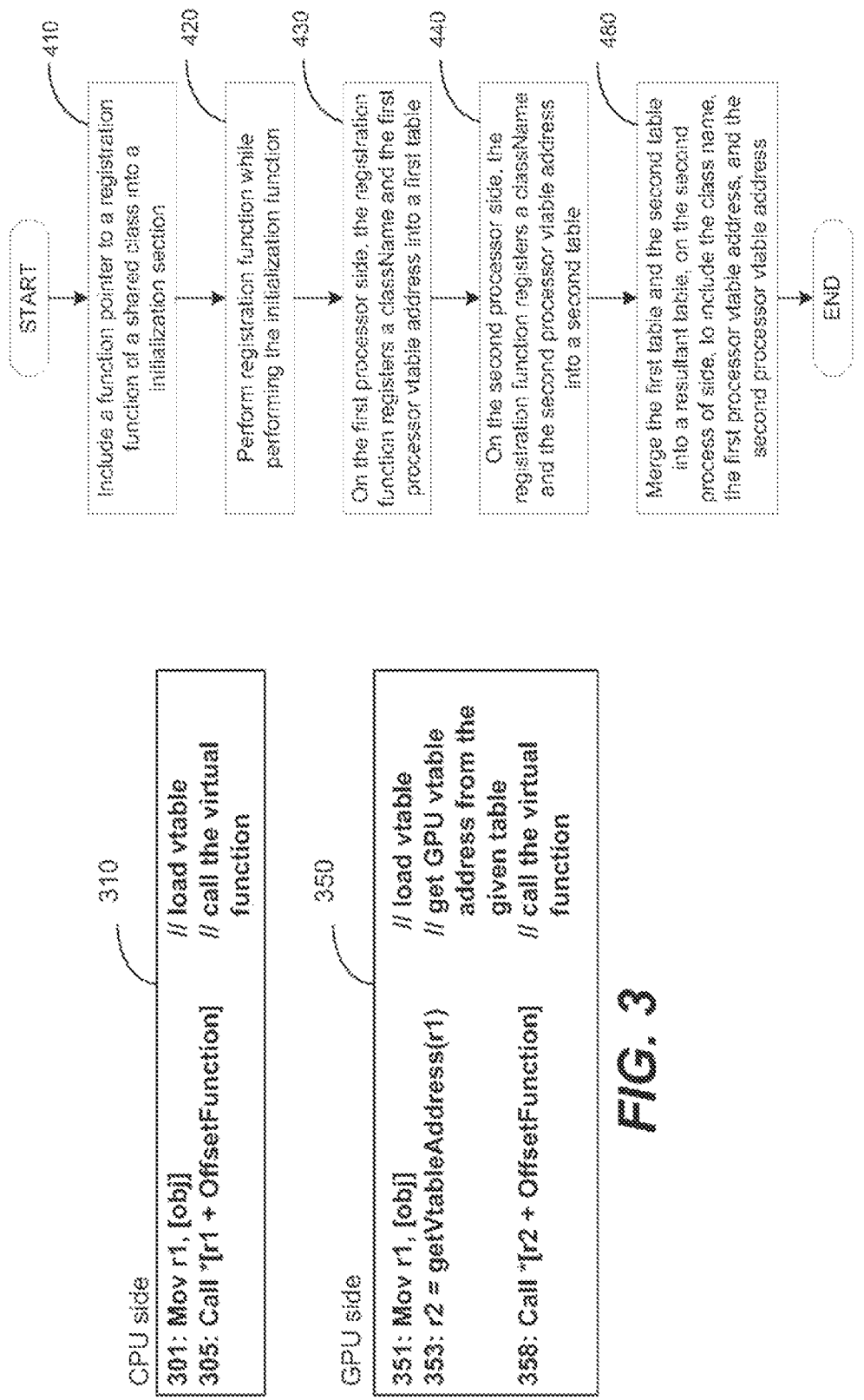

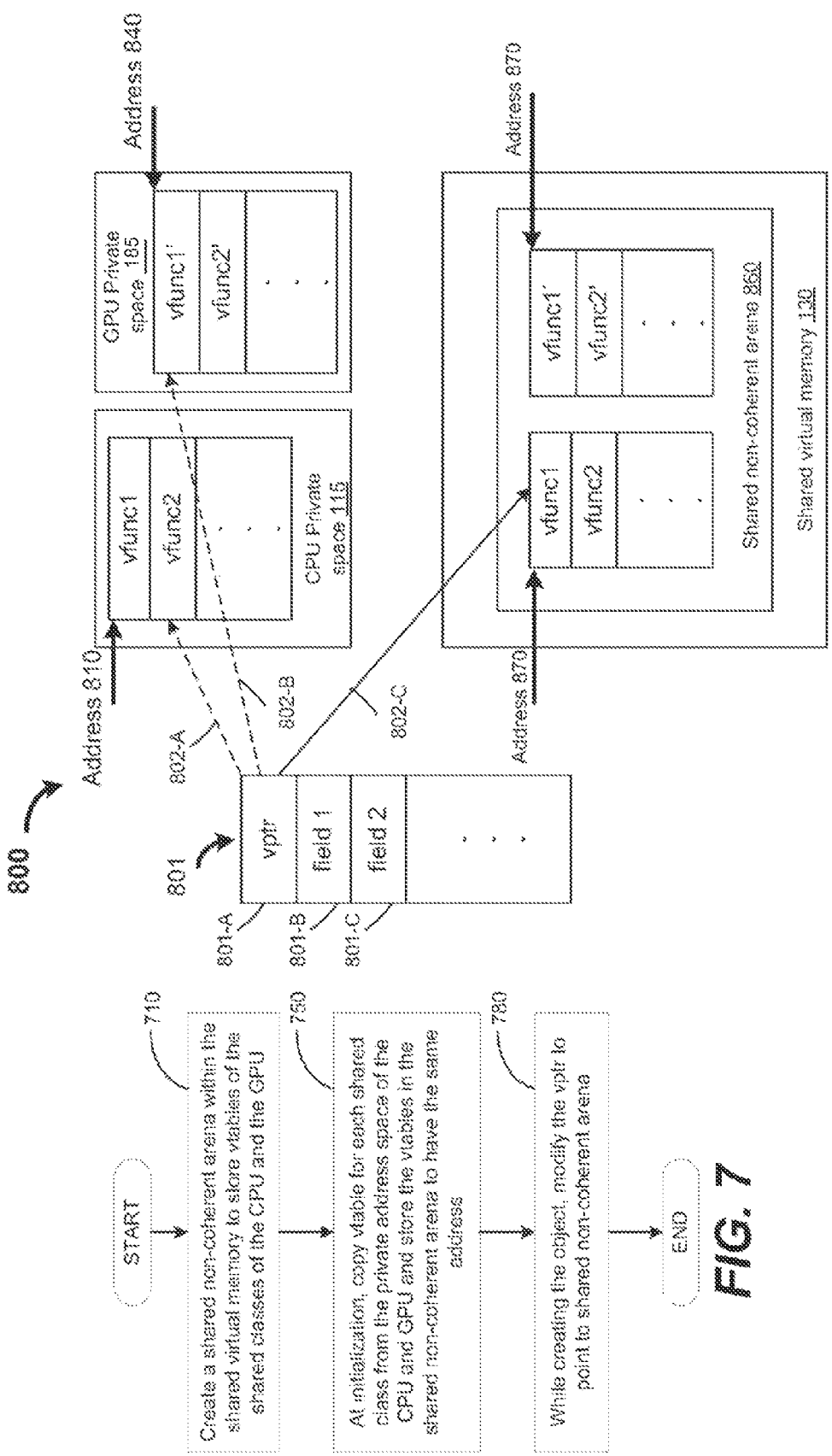

_US 8,997,113 B2_

SHARING VIRTUAL FUNCTIONS IN A SHARED VIRTUAL MEMORY BETWEEN HETEROGENEOUS PROCESSORS OF A COMPUTING PLATFORM

CROSS-REFERENCE TO RELATED APPLICATION

This patent application is a U.S. National Phase application under 35 U.S.C. §371 of International Application No. PCT/CN2010/001470, filed on Sep. 24, 2010, entitled SHARING VIRTUAL FUNCTIONS IN A SHARED VIRTUAL MEMORY BETWEEN HETEROGENEOUS PROCESSORS OF A COMPUTING PLATFORM.

BACKGROUND

Computing platforms may include heterogeneous processors such as a central processing unit (CPU) and a graphics processing unit (GPU), symmetric and asymmetric processors. The class instances (or objects) may reside in a first memory associated with a first side (e.g., CPU) of a CPU-GPU platform. The second side (GPU side) may not be enabled to invoke the objects and the associated member functions that reside in a first memory associated with the first side (CPU side) of the CPU-GPU platform. Also, the first side may not be enabled to invoke the objects and the associated member functions that reside in a second memory on the second side (GPU side). As the class instances or objects are stored in different address spaces, the existing communication mechanisms may merely allow one-way communication between the heterogeneous processors (CPU and the GPU) to invoke the class instance and the associated virtual functions.

Such one-way communication approach prevents a natural functionality partitioning of the class instances between the heterogeneous processors. An object may comprise throughput oriented member functions and some scalar member functions. For example, a scene class in a game application may have rendering functions that may be suited for the GPU and may also comprise physics and artificial intelligence (AI) functions that may be suited for execution on a CPU. With the current one-way communication mechanism, there typically has to be two different scene classes comprising CPU (physics and AI, in the above example) member functions and GPU (GPU suited rendering functions) member functions, respectively. Having two different scene classes one for the CPU and other for the GPU may require the data to be copied back and forth between the two scene classes.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 1 illustrates a platform 100 that supports sharing virtual functions stored in a shared virtual memory between heterogeneous processors provided in a computer platform in accordance with one embodiment.

FIG. 2 is a flow-chart, which illustrates an operation performed by the platform 100 to support sharing of virtual functions stored in a shared virtual memory between heterogeneous processors provided in a computer platform in accordance with one embodiment.

FIG. 3 illustrates a CPU side and GPU side code for loading a virtual function pointer from a shared object in accordance with one embodiment.

FIG. 4 is a flow-chart, which illustrates an operation performed by the platform 100 to generate a table to support sharing of virtual functions stored in a shared virtual memory between heterogeneous processors provided in a computer platform in accordance with a first embodiment.

FIG. 7 is a flow chart, which illustrates an operation performed by the platform 100 to use a virtual shared non-coherent region to support virtual function sharing between heterogeneous processors in accordance with an embodiment.

FIG. 8 is a relationship diagram, which illustrates use of a virtual shared non-coherent region to support virtual function sharing between heterogeneous processors in accordance with an embodiment.

DETAILED DESCRIPTION

Figure 5:
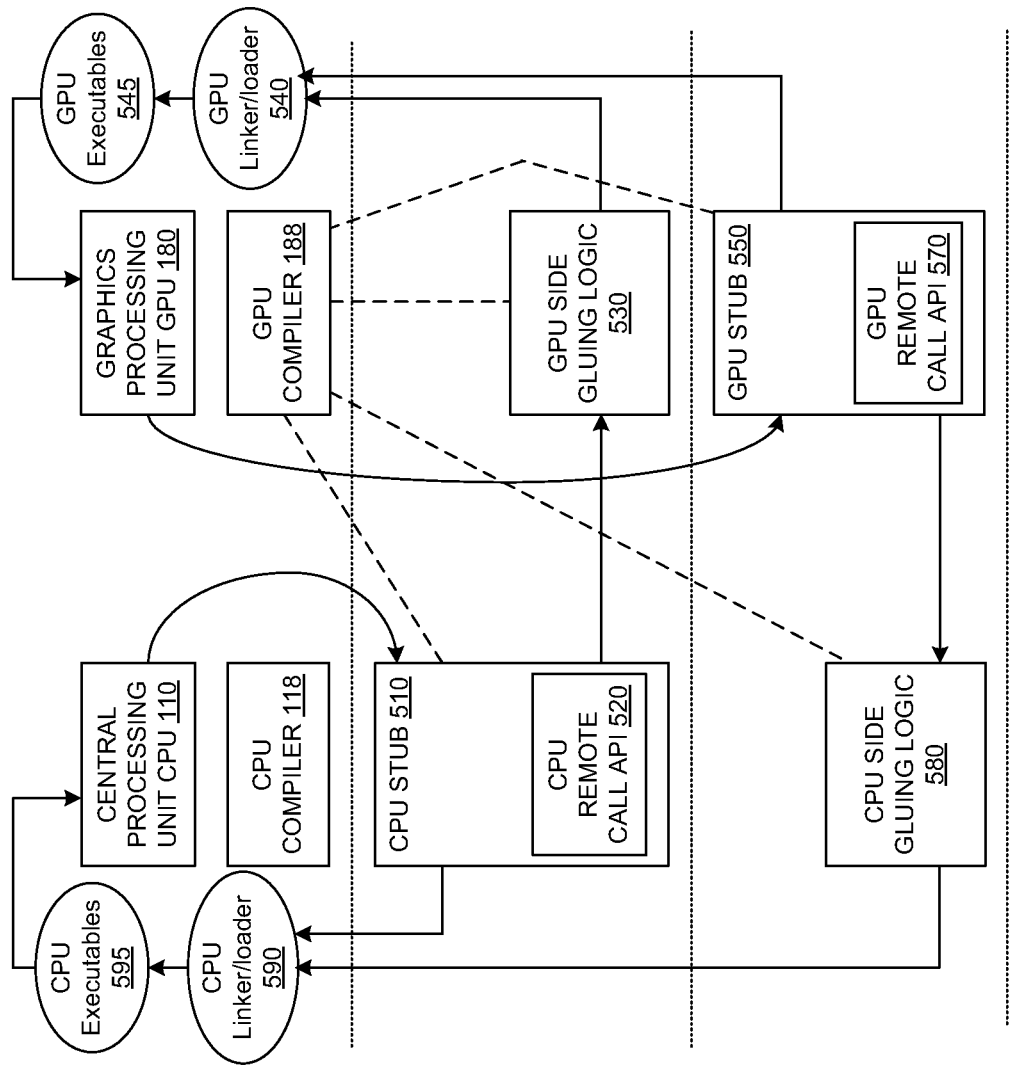
FIG. 5 illustrates a flow diagram used by the platform 100 to support two-way communication between the CPU 110 and the GPU 180 through member functions of the object that may be shared by the heterogeneous processors in accordance with one embodiment.

The following description describes techniques to share virtual functions, stored in a shared virtual memory, between heterogeneous processors of a computing platform. In the following description, numerous specific details such as logic implementations, resource partitioning, or sharing, or duplication implementations, types and interrelationships of system components, and logic partitioning or integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable storage medium may include any mechanism for storing or transmitting information in a form readable by a machine (e.g., a computing device).

For example, a machine-readable storage medium may include read only memory (ROM); random access memory (RAM); magnetic disk storage media; optical storage media; flash memory devices; electrical, optical forms of signals. Further, firmware, software, routines, and instructions may be described herein as performing certain actions. However, it should be appreciated that such descriptions are merely for convenience and that such actions in fact result from computing devices, processors, controllers, and other devices executing the firmware, software, routines, and instructions.

In one embodiment, a computing platform may support one or more techniques to allow two way communications (function calls) between the heterogeneous processors (e.g., a CPU and a GPU) through member functions such as a virtual functions of a shared object by fine grain partitioning the shared object. In one embodiment, the computing platform may allow two-way communications between the CPU and the GPU using a first technique referred to as a 'table-based' technique. In other embodiment, the computing platform may allow two-way communications between the CPU and the GPU using a second technique referred to as a 'non-coherent region' technique in which a virtual shared non-coherent region may be created in the virtual shared memory.

In one embodiment, while using the table-based technique, a CPU side vtable pointer of a shared object, which may be used to access the shared object from the CPU or GPU side, may be used to determine a GPU vtable if there exists a GPU-side table. In one embodiment, the GPU-side vtable may include<"className", CPU vtable addr, GPU vtable addr>. In one embodiment, the technique to get the GPU-side vtable address and to generate a GPU-side table is described below in further detail.

In other embodiment, while using the 'non-coherent region' technique, a shared non-coherent region is created within the shared virtual memory. In one embodiment, the shared non-coherent region may not maintain data consistency. In one embodiment, the CPU-side data and the GPU-side data within the shared non-coherent region may have same address as seen from the CPU-side and the GPU-side. However, the contents of the CPU-side data may be different from that of GPU-side data as shared virtual memory may not maintain coherency during the run-time. In one embodiment, the shared non-coherent region may be used to store a new copy of the virtual method table for each shared class. In one embodiment, such an approach may maintain the virtual table at the same address.

An embodiment of a computing platform 100 providing a virtual function in a virtual shared memory that may be shared between the heterogeneous processors such as the CPU and the GPU is illustrated in FIG. 1. In one embodiment, the platform 100 may comprise a central processing unit (CPU) 110, an operating system (OS) 112 associated with the CPU 110, a CPU private space 115, a CPU compiler 118, a shared virtual memory (or multi-version shared memory) 130, a graphics processing unit (GPU) 180, an operating system (OS) 182 associated with the GPU 180, a GPU private space 185, and a GPU compiler 188. In one embodiment, the OS 112 and OS 182 may, respectively, manage resources of the CPU 110 and the CPU private space 115, and the GPU 180, and the GPU private space 185. In one embodiment, to support shared virtual memory 130, the CPU private space 115 and the GPU private space 185 may comprise copies of multi-version data. In one embodiment, to maintain memory consistency, the meta-data such as the object 131 may be used for synchronizing the copies stored in the CPU private space 115 and the GPU private space 185. In other embodiment, the multi-version data may be stored in a physical shared memory such as a shared memory 950 (of FIG. 9, described below). In one embodiment, the shared virtual memory may be supported by physical private memory spaces such as CPU private space 115 and the GPU private space 185 of the heterogeneous processors CPU 110 and GPU 180 or a physical shared memory such as a shared memory 950 shared by the heterogeneous processors.

In one embodiment, the CPU compiler 118 and the GPU compiler 188 may be, respectively, coupled to the CPU 110 and the GPU 180 or may be provided remotely on other platforms or computer systems as well. The compiler(s) 118 associated with the CPU 110 may generate a compiled code for the CPU 110 and the compiler(s) 188 associated with the GPU 180 may generate a compiled code for the GPU 180. In one embodiment, the CPU compiler 118 and the GPU compiler 188 may generate a compiled code by compiling one or more member functions of the objects provided by a user in a high level language such as objected oriented language. In one embodiment, the compiler 118 and 188 may cause the object to be stored in the shared memory 130 and the shared object 131 may comprise member functions allocated to either CPU side 110 or the GPU side 180. In one embodiment, the shared object 131 stored in the shared memory 130 may comprise member functions such as virtual functions VF 133-A to 133-K and non-virtual functions NVF 136-A to 136-L. In one embodiment, the two-way communication between the CPU 110 and the GPU 180 may be provided by the member functions such as VF 133 and NVF 136 of the shared object 131.

In one embodiment, to achieve dynamic binding goal, a virtual function such as VF 133-A (a C++ virtual function, for example) may be called by one of the CPU 110 or the GPU 180 through indexing a virtual function table (vtable). In one embodiment, the virtual function table may be pointed to by a hidden pointer in share object 131. However, the CPU 110 and the GPU 180 may have different instruction set architecture (ISA) and while a function is compiled for CPU 110 and GPU 180 having different ISA's, the code representative of the same function compiled by the compliers 118 and 188 may be of different sizes. It may be challenging to lay out the code on the GPU side and the CPU side (i.e., the CPU version of a virtual function in a shared class and the GPU version of the same virtual function in a shared class) in an identical manner. If there are three virtual functions in a shared class Foo( ) in the CPU version of the code the functions may be located at address A1, A2, and A3. However, in the GPU version of the code the functions may be located at addresses B1, B2, and B3, which may be different from that of A1, A2, and A3. Such different address locations for CPU side and the GPU side code for the same function in the shared class may imply that the shared object (i.e., an instance of the shared class) may require 2 vtables (a first vtable and a second vtable). The first vtable may include the addresses (A1, A2, and A3) of the CPU side versions of the functions and the first vtable may be used while the object may be used in the CPU side (or to call CPU side functions). The second vtable may include addresses (B1, B2, and B3) of the GPU versions of the functions and the second vtable may be used while the object may be used in the GPU side (or to call GPU side functions).

In one embodiment, sharing virtual functions stored in the shared virtual memory between the CPU 110 and GPU 180 may be enabled by associating the first and the second vtables with the shared object 131. In one embodiment, a common vtable, which may be used for virtual function call on both the CPU side and the GPU side may be created by associating the first and the second vtable of the shared object 131.

An embodiment of the heterogeneous processors CPU 110 and GPU 180 sharing a virtual function stored in the shared virtual memory is depicted in flow-chart of FIG. 2. In block 210, the first processor such as the CPU 110 may identify a first processor side vtable pointer (CPU side vtable pointer) of the shared object 131. In one embodiment, a CPU side vtable pointer may exist for the shared object 131 irrespective of whether the shared object 131 may be accessed by the CPU side or the GPU side.

In one embodiment, for a normal virtual function call in a computing system such as CPU-only environment, the code sequence may be as shown in block 310 of FIG. 3. In one embodiment, even in a computing system such as 100, which may include heterogeneous processors, the CPU side code sequence for a normal virtual function call may be same as that depicted in block 310 of FIG. 3.

As depicted in block 310, the code in line 301: Mov r1, [obj] may load the vtable of the shared object 131 to a variable r1. The code in line 305: (Call *[r1+offsetFunction]) may call the virtual function such as VF 133-A of the shared object 131.

In block 250, the second processor such as the GPU 180 may use the first processor side vtable pointer (CPU side vtable pointer) of the shared object 131 to determine the second processor side vtable (GPU side vtable) if there exists a second processor side table (GPU table). In one embodiment, the second processor side table (GPU table) may include <"className", first processor side vtable address, second processor side vtable address>.

In one embodiment, on the GPU side, the GPU 180 may generate a code sequence depicted in block 350 that may be different from the code sequence depicted in block 310. In one embodiment, as the GPU compiler 188 may be aware of every shareable class from the type, the GPU 180 can generate the code sequence depicted in block 350 for loading the virtual function pointer from a shared object such as the shared object 131. In one embodiment, the code in line 351: Mov r1, [obj] may load the CPU vtable addr and the code in line 353: R2=getVtableAddress(r1); may get the GPU vtable from the GPU table. In one embodiment, the code in line 358: (Call *[r2+offsetFunction]) may call the virtual function based on the GPU vtable generated using the CPU vtable address. In one embodiment, the getVtableAddress function may use the CPU side vtable address to index into the GPU table to determine the GPU side vtable.

In block 280, the first processor (the CPU 110) and the second processor (the GPU 180) may be enabled for a two-way communication using the shared object 131.

An embodiment of creating the GPU table is illustrated using flow-chart of FIG. 4. In block 410, the table can be formed during initialization time, in one embodiment, by including a function pointer to a registration function of a shareable class (the shared object 131) into the initialization section (e.g., CRT$XCI section for MS C++). For example, a registration function of the shareable class may be included into the MS CRT$XCI section initialization section.

In block 420, the registration function may be performed during the initialization time. As a result of including the function pointer to the registration function into the initialization section, the registration function may be performed while performing the initialization section.

In block 430, on the first processor side (the CPU side), the registration function may register a "className" and a "CPU vtable addr" into the first table. In block 440, on the second processor side (the GPU side), the registration function may register a "className" and a "GPU vtable addr" into a second table.

In block 480, the first table and the second table may be merged into one common table. For example, a first entry of the first table may be combined with a first entry of the second table if the first and the second table include the same "className". As a result of merging, the combined entries of the first and the second table may appear as one entry with a single className. In one embodiment, the common table may reside at the GPU side and the common table or the GPU table may include "className", CPU vtable addr, and GPU vtable addr.

In one embodiment, creating a common table or the GPU table may avoid the requirement to match the vtable addresses on the CPU side and the GPU side. Also, the GPU table may support dynamic linked libraries (DLLs). In one embodiment, the class may be loaded on the CPU side before the shared object 131 may be initialized or used on the GPU side. However, as the application is generally loaded on the CPU side, the GPU table may enable two-way communication between the CPU 110 and GPU 180 for the classes defined in the application and statically linked libraries as well. For DLLs, the DLL may be loaded on the CPU side and the GPU table may be used for two-way communication for the DLLs as well.

The shareable object 131 may include a CPU side vtable pointer and may not have extra vtable pointer for GPU side vtable. In one embodiment, using the in-object CPU vtable pointer, the GPU vtable pointer may be generated as described in block 350 and FIG. 4 above. In one embodiment, the CPU vtable pointer on CPU side may be used as is while the GPU vtable pointer on GPU side may be used for a virtual function call. In one embodiment, such an approach may not involve modification or involvement of a linker/loader and does not require an extra vptr pointer field in shared object 131 either. Such an approach may allow fine-grain partitioning of an application written with object oriented languages between the CPU 110 and the GPU 180.

An embodiment of a flow diagram used by the computing platform 100 to support two-way communication between the CPU 110 and the GPU 180 through member functions of the object that may be shared by the heterogeneous processors is illustrated in FIG. 5. In one embodiment, the GPU compiler 188 may generate a CPU stub 510 for GPU functions and a CPU remote call API 520 on the CPU side 110. Also, the GPU compiler 188 may generate a GPU side gluing logic 530 for GPU functions on the GPU side 180 for the first member functions. In one embodiment, the CPU 110 may make calls to the first member functions using the first enabling path (comprising stub logic 510, API 520, and gluing logic 530) of a first path. In one embodiment, the first enabling path may allow the CPU 110 to establish a remote call with the GPU side 180 and transfer information from the CPU side 110 to the GPU side 180. In one embodiment, the GPU side gluing logic 530 may allow the GPU 180 to receive the information transferred from the CPU side 110.

In one embodiment, the CPU stub 510 may comprise the same name as the first member functions (i.e., original GPU member functions) but may enclose the API 520 to direct the call from the CPU 110 to the GPU 180. In one embodiment, the code generated by the CPU compiler 118 may call the first member functions as is but the call may be redirected to the CPU stub 510 and the remote call API 520. Also, while making a remote call, the CPU stub 510 may send a unique name representing the first member functions being called and a pointer to the shared object and other arguments of the called first member function. In one embodiment, the GPU side gluing logic 530 may receive the arguments and dispatch the first member functions call. In one embodiment, the GPU compiler 188 may generate a gluing logic (or a dispatcher) that may dispatch non-virtual functions by calling the GPU side function address for the first member functions with the object pointer passed as a first parameter. In one embodiment, the GPU compiler 188 may generate a jump table registration call on the GPU side to register the GPU side gluing logic 530 to enable CPU stub 510 to communicate with the GPU side gluing logic 530.

In one embodiment, the GPU compiler 188 may create a second enabling path comprising GPU stub 550 for CPU functions, a GPU remote call API 570 on the GPU side 180, and CPU side gluing logic 580 for the second member functions allocated to the CPU 110. In one embodiment, the GPU 180 may make calls to the CPU side 110 using the second enabling path. In one embodiment, the GPU stub 550 and the API 570 may allow the GPU 180 to establish a remote call with the CPU side 110 and transfer information from the GPU side 180 to the CPU side 110. In one embodiment, the CPU side gluing logic 580 may allow the CPU 110 to receive the information transferred from the GPU side 180.

In one embodiment, to support the second member function call, the GPU compiler 188 may generate a jump table registration for the CPU side gluing logic 580. In one embodiment, the CPU side function address for the second member functions may be called in the CPU gluing logic 580. In one embodiment, the code generated by the CPU gluing logic 580 may be linked with other code generated by the CPU compiler 118. Such an approach may provide a path to support two-way communication between the heterogeneous processors 110 and 180. In one embodiment, the CPU stub logic 510 and the CPU side gluing logic 580 may be coupled to the CPU 110 via CPU linker 590. In one embodiment, the CPU linker 590 may generate CPU executables 595 using the CPU stub 510, the CPU side gluing logic 580, and other code generated by the CPU compiler 118. In one embodiment, the GPU stub logic 550 and the GPU side gluing logic 530 may be coupled to the GPU 180 via a GPU linker 540. In one embodiment, the GPU linker 540 may generate GPU executables 545 using the GPU gluing logic 530, the GPU stub logic 550, and the other code generated by the GPU compiler 188.

Figure 6:
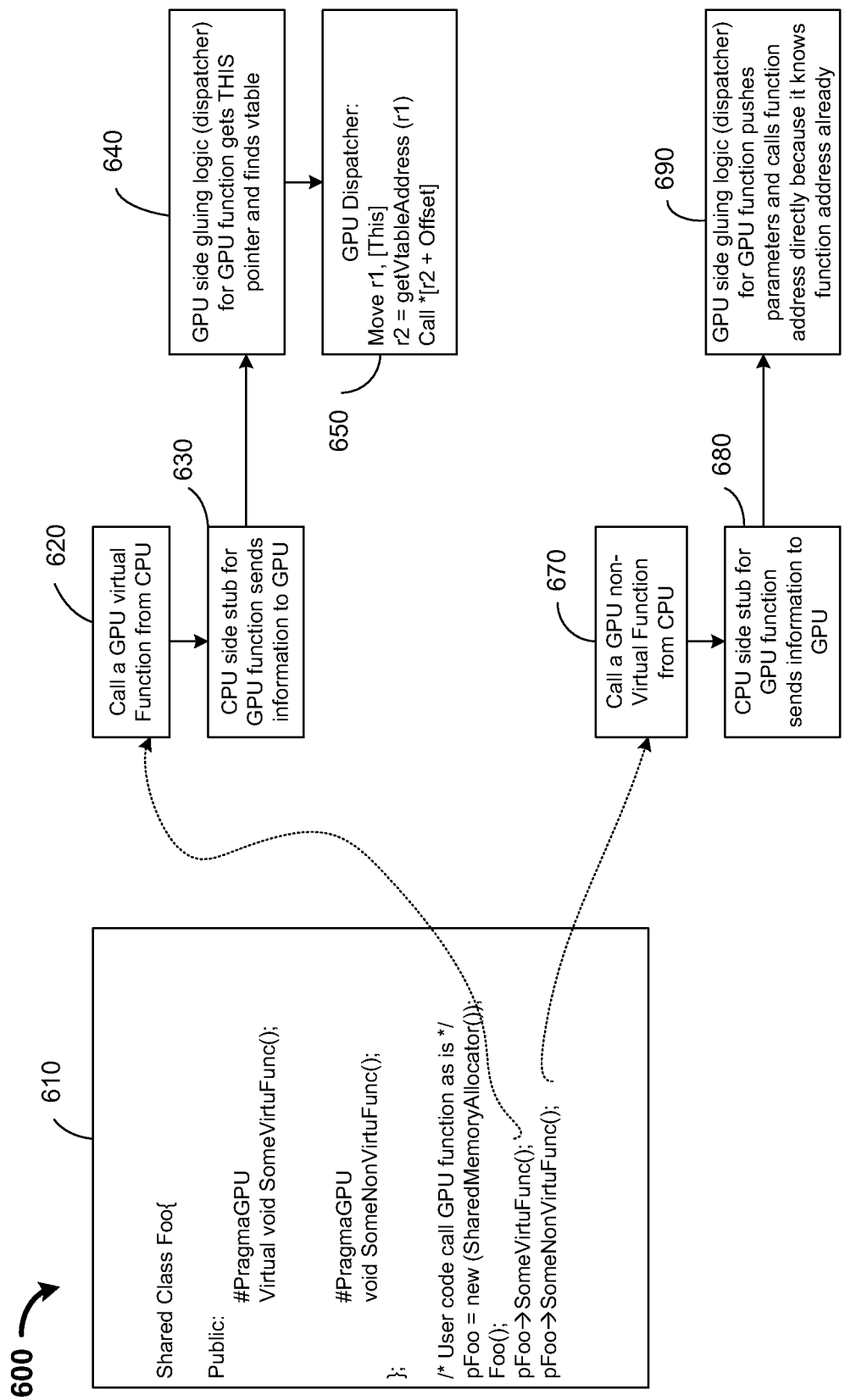
FIG. 6 illustrates a flow diagram depicting processing of a GPU virtual function and GPU function call made by the CPU side as it is in accordance with the first embodiment.

An embodiment of a flow diagram 600 in which a GPU virtual function and GPU non-virtual function is called by the CPU side 110 using the table-based technique described above is illustrated in FIG. 6. Block 610 is shown comprising a shared class instance of an object titled shared class Foo( ), which includes a first annotation tag #Pragma GPU annotating the virtual function (VF 133-A, for example) and a virtual function call 'Virtual void SomeVirtFunc( )' and a second annotation tag #Pragma GPU annotating the non-virtual function (NVF 136-A, for example) and a non-virtual function call 'void SomeNonVirtuFunc( )'.

In one embodiment, 'pFoo' may point to a shared object 131 of class Foo( ) and a remote virtual function call may be completed from the CPU side 110 to the GPU side 180. In one embodiment, 'pFoo=new(SharedMemoryAllocator( ) Foo( )' may be one possible way to override new/delete operator with shared memory allocation/release runtime calls. In one embodiment, the CPU compiler 118, in response to compiling 'pFoo→SomeVirtuFunc( )' in block 610, may initiate a task depicted in block 620.

In block 620, the CPU side 110 may call a GPU virtual function. In block 630, the CPU side stub (for GPU member functions) 510 and the API 520 may send information (arguments) to the GPU side 180. In block 640, the GPU side gluing logic (for GPU member functions) 530 may get pGPUVptr (CPU side vtable pointer) from THIS object and may find the GPU vtable. In block 650, the GPU side gluing logic 530 (or the dispatcher) may have a code sequence depicted in block 350 described above to get the GPU side vtable using the CPU side vtable pointer.

In one embodiment, the GPU compiler 188 in response to compiling #Pragma GPU 'void SomeNonVirtuFunc( )' in block 610 may generate code to use 'pFoo→SomeNonVirtuFunc( )' to initiate a task depicted in block 670. In block 670, the CPU side 110 may call a GPU non-virtual function. In block 680, the CPU side stub 510 and the API 520 may send information (arguments) to the GPU side 180. In block 690, the GPU side gluing logic 530 may push parameters and calls the address directly as the function address may be already known.

An embodiment of an operation performed by the computing platform 100 to use a virtual shared non-coherent region to support virtual function sharing between heterogeneous processors is illustrated in the flow-chart of FIG. 7. In computing system such as computing system 100 including heterogeneous processors such as the CPU 110 and the GPU 180, the CPU 110 and the GPU 180 may run different codes generated by different compilers such as 118 and 188 (or same compiler with different targets), the same virtual function may not be guaranteed to be located at the same address. While it may be possible to modify the compiler/linker/loader to support sharing of virtual functions, the 'non-coherent region' approach (a runtime-only approach) described below may be a simpler technique to allow sharing of virtual functions between the CPU 110 and the GPU 180. Such an approach may allow shared virtual memory systems such as Mine/Yours/Ours (MYO) to be accepted and deployed with ease. Though a C++ object oriented language is used as an example, but the below approach may be applicable to other object-oriented programming languages, which support virtual functions.

In block 710, the CPU 110 may create a shared non-coherent region within the shared virtual memory 130 to store vtables of the shared classes of the CPU 110 and the GPU 180. In one embodiment, the shared non-coherent region may be created by specifying a non-coherent tag to a region within the shared virtual memory 130. In one embodiment, the MYO runtime may provide one or more application programmable interface (APIs) functions to create a virtual shared region (referred to as "arenas" in the MYO's terminology and many such arenas may be created may be created in MYO). For example, a tag such as myoArenaCreate(xxx, . . . , NonCoherentTag) or myoArenaCreateNonCoherentTag(xxx, . . . ) may be used. In one embodiment, using the above tags may create either a coherent or a non coherent arena. However, in other embodiment, the API function may be used to change the property of the memory chunk (or portion). For example, myoChangeToNonCoherent(addr size) may be used to create a first region as NonCoherent region or arena and a second region (or portion) as a coherent arena. In one embodiment, the first region may be specified by the address size.

In one embodiment, a memory arena (i.e. managed memory chunk), which may allow data sharing without maintaining the data consistency may be created and such a memory arena may be referred to as shared non-coherent region. In one embodiment, the CPU data and the GPU data stored in the shared non-coherent region may have the same address as seen by both the CPU 110 and the GPU 180. However, the contents (CPU data and the GPU data) may be different as the shared virtual memory 130 such as MYO may not maintain the coherency at runtime. In one embodiment, the shared non-coherent region may be used to store a new copy of the virtual method table for each shared class. In one embodiment, the virtual function table addresses as seen from the CPU 110 and the GPU 180 may be same; however, the virtual function tables may be different.

In block 750, during the initialization time, vtable for each shareable class may be copied from the CPU private space 115 and the GPU private space 185 to the shared virtual memory 130. In one embodiment, the CPU side vtable may be copied into the non-coherent region within the shared virtual memory 130 and the GPU side vtable may, also, be copied into the non-coherent region within the shared virtual memory 130. In one embodiment, in the shared space, the CPU side vtable and the GPU side vtable may be located at the same address.

In one embodiment, if a toolchain support is available, the CPU compiler 118 or the GPU compiler 188 may include the CPU and the GPU vtable data in a special data section, and the loader 540 or 590 may load the special data section to the shared non-coherent region. In other embodiment, the CPU compiler 118 or the GPU compiler 188 may allow the special data section to be created using, for example, an API call such as myoChangeToNonCoherent, into a shared non-coherent region. In one embodiment, the CPU compiler 118 and the GPU compiler 188 may ensure that the CPU vtable and the GPU vtable may be located at the same offset address within the special data section (with proper padding if not). In one embodiment, in case of multiple-inheritance, there may be multiple vtable pointers in the object layout. In one embodiment, the CPU compiler 118 and the GPU compiler 188 may also ensure that the CPU vtable and the GPU vtable pointers may be located at the same offset in the object layout.

In the absence of toolchain support, in one embodiment, the user may be allowed to copy the CPU vtable and the GPU vtable to the shared non-coherent region. In one embodiment, one or more macros may be generated to ease such manual copying of the CPU and GPU tables to the shared non-coherent memory region.

At runtime, after a shared object such as the shared object 131 may be created, an object layout 801, which may include multiple "vptr" for multiple inheritances may be created. In one embodiment, the virtual table pointer (vptr) of the shared object 131 in the object table 801 may be updated (patched) to point to a new copy of the virtual function table in the shared non-coherent region. In one embodiment, the virtual table pointer of the shared object may be updated using the constructor of a class, which may include virtual functions. In one embodiment, if a class does not include any virtual functions, the data and functions of such class may be shared and it may not be necessary to update (or patch) during the run time.

In block 780, the vptr (vtable pointer) may be modified to point to the shared non-coherent region, while creating the shared object 131. In one embodiment, the vptr, by default pointing to the private vtables (CPU vtable or GPU vtable), may be modified (as indicated by the solid line 802-C, in FIG. 8) to point to the shared non-coherent region 860. In one embodiment, a virtual function may be called as follows:

Mov eax, [ecx] # ecx contains "this" pointer, eax contains vptr;

Call [eax, vfunc] # vfunc is the virtual function index in the virtual function table.

At the CPU side, the above code may call the CPU implementation of a virtual function; and at the GPU side, the above code may call the GPU implementation of a virtual function. Such an approach may allow data sharing and virtual function sharing for a class.

An embodiment of a relationship diagram 800, which illustrates use of a virtual shared non-coherent region to support virtual function sharing between heterogeneous processors, is illustrated in FIG. 8. In one embodiment, the object layout 801 may include a virtual table pointer (vptr) in the first slot 801-A and other fields such as field 1 and field 2 in the slots 801-B and 801-C. In one embodiment, after the CPU compiler 118 and the GPU compiler 188 performs the vtable pointer (vptr) located in the slot 801-A to generate (as indicated by dotted line 802-A) the CPU vtable and the GPU vtable (as indicated by the dotted line 802-B). The CPU virtual function table (CPU vtable) may be located at Address 810 within the CPU private address space 115 and the GPU vtable may be located at Address 840 within the GPU private address space 185. In one embodiment, the CPU vtable may include function pointers such as vfunc1 and vfunc2 and the GPU vtable may include function pointers such as vfunc1' and vfunc2'. In one embodiment, the function pointers (vfunc1 and vfunc2) and (vfunc1' and vfunc2') may also be different as the pointers points to different implementation of the same function.

In one embodiment, as a result of modifying the vptr (as shown in block 780), the vptr may point to the shared non-coherent region 860 within the shared virtual memory 130. In one embodiment, the CPU vtable may be located at an address Address 870 and the GPU vtable may be located at the same address Address 870. In one embodiment, the CPU vtable may include function pointers such as vfunc1 and vfunc2 and the GPU vtable may include function pointers such as vfunc1' and vfunc2'. In one embodiment, the function pointers (vfunc1 and vfunc2) and (vfunc1' and vfunc2') may be different. In one embodiment, saving the CPU vtable and the GPU vtable in the shared non-coherent region 860 may enable the CPU 110 and the GPU 180 to, respectively, see the CPU vtable and the GPU vtable at the same address location Address 870, however, the contents (vfunc1 and vfunc2) of the CPU vtable may be different from the contents (vfunc1' and vfunc2') of the GPU vtable.

Figure 9:
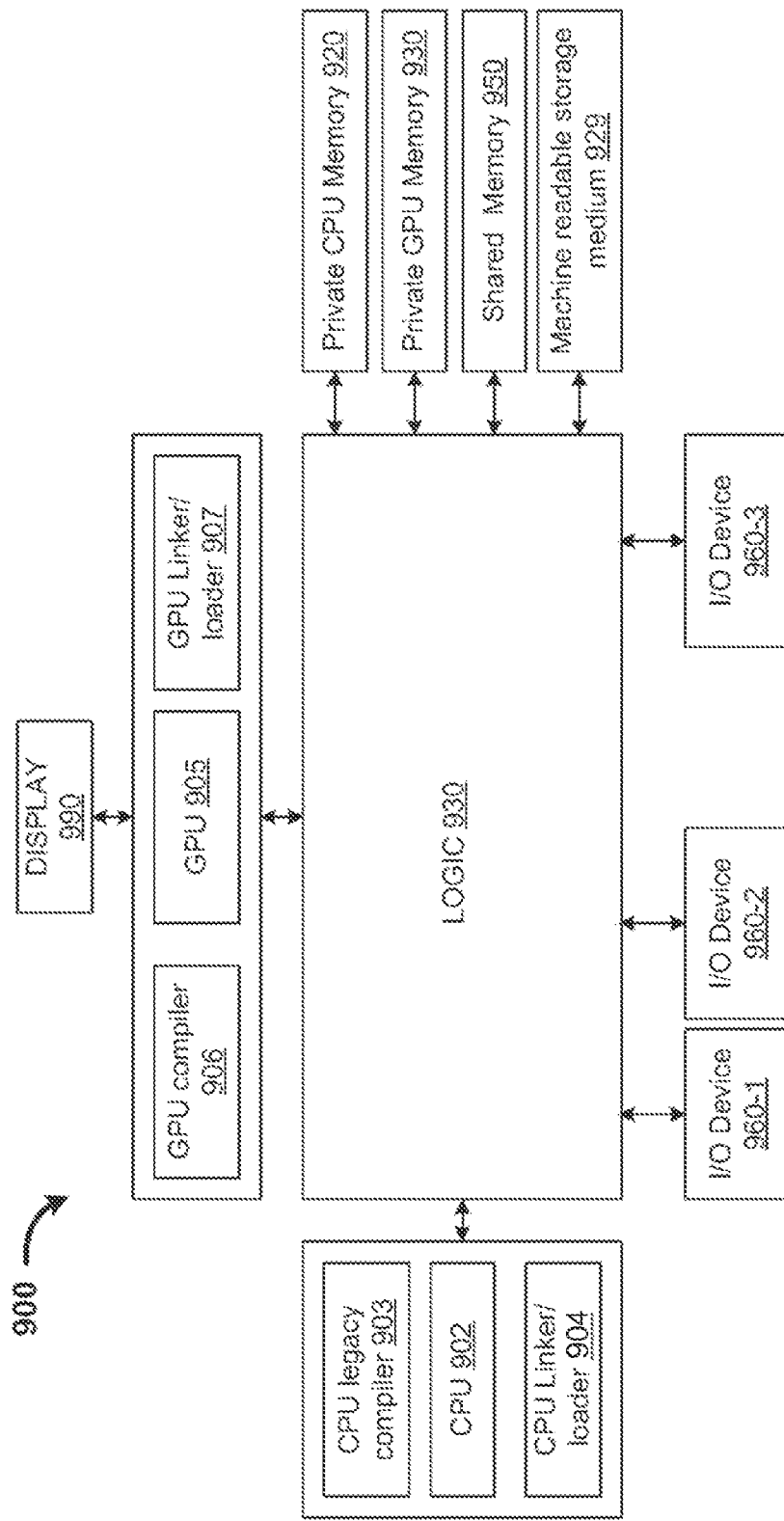
FIG. 9 illustrates a computer system that may provide support to share virtual functions stored in a shared virtual memory between heterogeneous processors provided in a computer platform in accordance with one embodiment.

An embodiment of a computer system 900 comprising the heterogeneous processors that support two-was communications is illustrated in FIG. 9. Referring to FIG. 9, the computer system 900 may include a general purpose processor (or CPU) 902 including a single instruction multiple data (SIMD) processor and a graphics processor unit (GPU) 905. The CPU 902, in one embodiment, may perform enhancement operations in addition to performing various other tasks or store a sequence of instructions, to provide enhancement operations in machine readable storage medium 929. However, the sequence of instructions may also be stored in the CPU private memory 920 or in any other suitable storage medium. In one embodiment, the CPU 902 may be associated with a CPU legacy compiler 903 and a CPU linker/loader 904. In one embodiment, the GPU 905 may be associated with a GPU proprietary compiler 906 and a GPU linker/loader 907.

While a separate graphics processor unit (GPU) 905 is depicted in FIG. 9, in some embodiments, the processor 902 may be used to perform enhancement operations, as another example. The processor 902 that operates the computer system 900 may be one or more processor cores coupled to logic 930. The logic 930 may be coupled to one or more I/O devices 960, which may provide interface to the computer system 900. The logic 930 is coupled to the memory 920, which may be any kind of storage, including optical, magnetic, or semiconductor storage. The graphics processor unit 905 is coupled through a frame buffer to a display 990.

In one embodiment, a computer system 900 may support one or more techniques to allow two way communications (function calls) between the heterogeneous processors the CPU 902 and the GPU 905 through member functions such as a virtual functions of a shared object by fine grain partitioning the shared object. In one embodiment, the computer system 900 may allow two-way communications between the CPU 902 and the GPU 905 using a first technique referred to as a 'table-based' technique. In other embodiment, the computing platform may allow two-way communications between the CPU 902 and the GPU 905 using a second technique referred to as a 'non-coherent region' technique in which a virtual shared non-coherent region may be created in the virtual shared memory located either in the private CPU memory 920, the private GPU memory 930, or the shared memory 950. In one embodiment, a separate shared memory such as the shared memory 950 may not be provided in the computer system 900 and in such a case shared memory may be provided within one of the private memories such as CPU memory 920 or the GPU memory 930.

In one embodiment, while using the table-based technique, a CPU side vtable pointer of a shared object, which may be used to access the shared object from the CPU 110 or GPU 180, may be used to determine a GPU vtable if there exists a GPU-side table. In one embodiment, the GPU-side vtable may include <"className", CPU vtable addr, GPU vtable addr>. In one embodiment, the technique to get the GPU-side vtable address and to generate a GPU-side table as described above.

In other embodiment, while using the 'non-coherent region' technique, a shared non-coherent region is created within the shared virtual memory. In one embodiment, the shared non-coherent region may not maintain data consistency. In one embodiment, the CPU-side data and the GPU-side data within the shared non-coherent region may have same address as seen from the CPU-side and the GPU-side. However, the contents of the CPU-side data may be different from that of GPU-side data as shared virtual memory may not maintain coherency during the run-time. In one embodiment, the shared non-coherent region may be used to store a new copy of the virtual method table for each shared class. In one embodiment, such an approach may maintain the virtual table at the same address.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multi-core processor or as a set of software instructions stored in a machine readable medium.

What is claimed is:

1. A method to be performed in a computing platform having a plurality of heterogeneous processors including at least a first processor and a second processor, the method comprising:
    creating a shared object including a plurality of virtual functions that can be utilized by the first processor and the second processor and a function pointer to a registration function,
    identifying a first processor side virtual table pointer for the shared object,
    determining a second processor side virtual table using the first processor side virtual table pointer,
    registering a class name and a first processor side virtual table address in a first table while performing the registration function on the first processor,
    registering the class name and a second processor side virtual table address in a second table while performing the registration function on the second processor,
    generating a second processor side table by merging the first table and the second table, wherein the second side processor table includes the class name, the first processor virtual table address, and the second processor virtual table address,
    storing the shared object in a shared virtual memory accessible by the first processor and the second processor, and
    selecting an appropriate virtual table address for a class name from the second processor side table, wherein use of the second processor side table by the first processor and the second processor enables the first processor and the second processor to share at least one of the plurality of virtual functions.

2. The method of claim 1, further comprising having the first processor side virtual table pointer included in the shared object.

3. The method of claim 1, wherein the generating a second processor side table is done during an initialization phase of performing a program.

4. The method of claim 3, wherein the function pointer to the registration function of the shared object is included in an initialization section to perform the registration function during the initialization phase.

5. The method of claim 1, wherein the second processor side table is to support dynamically linked libraries and statically linked libraries.

6. A method to be performed in a computing platform having a plurality of heterogeneous processors including at least a first processor and a second processor, the method comprising:
    creating a shared object including a plurality of virtual functions that can be utilized by the first processor and the second processor,
    storing the shared object in a shared virtual memory accessible by the first processor and the second processor,
    identifying a first processor side virtual table for the virtual functions of the shared object to be called by the first processor,
    identifying a second processor side virtual table for the virtual functions of the shared object to be called by the second processor,
    creating a shared non-coherent region within the shared virtual memory to store the first processor side virtual table and the second processor side virtual table,
    modifying a virtual pointer pointing to the first processor side virtual table and the second processor side virtual table to point to the shared non-coherent region,
    copying virtual tables of the shared object from private address spaces of the first processor and the second processor into the shared non-coherent re ion wherein the virtual tables of the shared object are located at a same address in the shared non-coherent region even if contents of the virtual tables are different, and
    selecting an appropriate virtual function from the shared non-coherent region, wherein use of the shared non-coherent region by the first processor and the second processor enables the first processor and the second processor to share at least one of the plurality of virtual functions.

7. The method of claim 6, further comprising adding a non-coherent tag to a region in the shared virtual memory to create the shared non-coherent region.

8. The method of claim 6, wherein the modifying a virtual pointer is done while creating the shared object.

9. A non-transitory machine-readable storage medium comprising a plurality of instructions that in response to being executed result in a computing platform:
  creating a shared object including a plurality of virtual functions that can be utilized by the first processor and the second processor and a function pointer to a registration function,
  identifying a first processor side virtual table pointer for the shared object,
  determining a second processor side virtual table using the first processor side virtual table pointer,
  registering a class name and a first processor side virtual table address in a first table while performing a registration function on the first processor,
  registering the class name and a second processor side virtual table address in a second table while performing the registration function on the second processor,
  generating a second processor side table by merging the first table and the second table, wherein the second side processor table includes the class name, the first processor virtual table address, and the second processor virtual table address,
  storing the shared object in a shared virtual memory accessible by the first processor and the second processor, and
  selecting an appropriate virtual table address for a class name from the second processor side table, wherein use of the second processor side table by the first processor and the second processor enables the first processor and the second processor to share at least one of the plurality of virtual functions, wherein the computing platform includes a plurality of heterogeneous processors including at least the first processor and the second processor.

10. The non-transitory machine-readable storage medium of claim 9, wherein when executed the instructions further result in the computing platform having the first processor side virtual table pointer included in the shared object.

11. The non-transitory machine-readable storage medium of claim 9, wherein when executed the instructions further result in the computing platform generating the second processor side table during an initialization phase of performing a program.

12. The non-transitory machine-readable storage medium of claim 11, wherein when executed the instructions result in the computing platform including the function pointer to the registration function of the shared object into an initialization section to perform the registration function during the initialization phase.

13. The non-transitory machine-readable storage medium of claim 9, wherein the second processor side table is to support dynamically linked libraries and statically linked libraries.

14. A non-transitory machine-readable storage medium comprising a plurality of instructions that in response to being executed result in a computing platform:
  creating a shared object including a plurality of virtual functions that can be utilized by a first processor and a second processor,
  storing the shared object in a shared virtual memory accessible by the first processor and the second processor,
  identifying a first processor side virtual table for the virtual functions of the shared object to be called by the first processor,
  identifying a second processor side virtual table for the virtual functions of the shared object to be called by the second processor,
  creating a shared non-coherent region within the shared virtual memory to store the first processor side virtual table and the second processor side virtual table,
  modifying a virtual pointer pointing to the first processor side virtual table and the second processor side virtual table to point to the shared non-coherent region,
  copying virtual tables of the shared object from private address spaces of the first processor and the second processor into the shared non-coherent region, wherein the virtual tables of the shared object are located at a same address in the shared non-coherent region even if contents of the virtual tables are different, and
  selecting an appropriate virtual function from the shared non-coherent region, wherein use of the shared non-coherent region by the first processor and the second processor enables the first processor and the second processor to share at least one of the plurality of virtual functions, wherein the computing platform includes a plurality of heterogeneous processors including at least the first processor and the second processor.

15. The non-transitory machine-readable storage medium of claim 14, wherein when executed the instructions further result in the computing platform adding a non-coherent tag to a region in the shared virtual memory to create the shared non-coherent region.

16. The non-transitory machine-readable storage medium of claim 14, wherein when executed the instructions result in the computing platform modifying the virtual pointer while creating the shared object.

* * * * *